No. 33,138.  
J. C. GIBBS.  
SHIP'S SCRAPER.  
PATENTED AUG. 27, 1861.
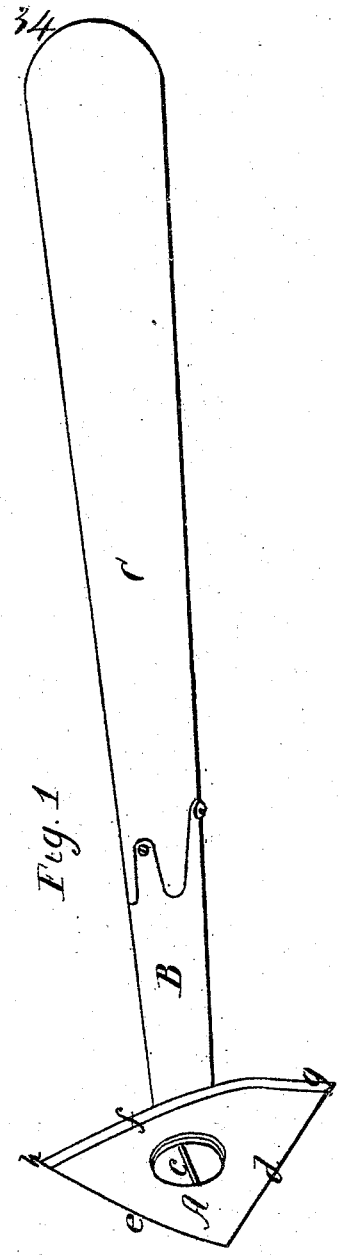
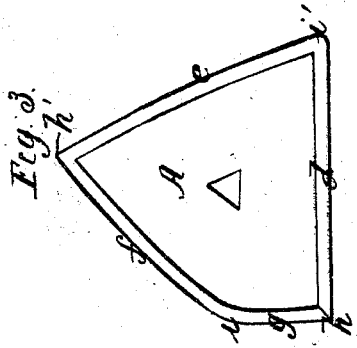
Witnesses:
Inventor;
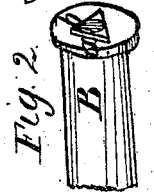

UNITED STATES PATENT OFFICE.

JOHN C. GIBBS, OF MIDDLEBORO, MASSACHUSETTS.

SHIP'S SCRAPER.

Specification of Letters Patent No. 33,138, dated August 27, 1861.

*To all whom it may concern:*

Be it known that I, JOHN C. GIBBS, of Middleboro, in the county of Plymouth and State of Massachusetts, have invented a new and useful Implement or Device for Scraping About the Seams, &c., of Vessels; and I do hereby declare that the following is a full, clear, and exact description thereof, reference being had to the accompanying drawings, making part of this specification, in which—

Figure 1. is a perspective view of my improved ship's scraper. Fig. 2. shows the end of the handle of the scraper. Fig. 3. shows a plate shaped the reverse of Fig. 1.

Similar letters of reference indicate corresponding parts in the three figures.

The object of this invention is to obtain an improvement that will facilitate the scraping of the seams of vessels, covings and other parts of a vessel that require to be scraped, without injuring or defacing the wood-work during the operation. This work is at present performed with a trilateral scraper or plain straight edged knife, and the operation is not only slow, but in careless hands, or even with the best of care, the work is only half done or else the joints are opened and made to leak, or the covings are badly defaced, in consequence of the ill manner in which the tool, used in the operation, is adapted to perform its work, the scraping surfaces of which do not conform to the surfaces to be scraped.

My invention consists in using a steel plate formed in such a manner that the advantage of the straight edged scraper is combined with straight and curved edges and sharp and rounding corners, which may be made to conform to concave, convex, plane or angular surfaces, or to any and all surfaces that are to be scraped of adhering gum, oil, pitch &c; said plate being attached to a suitable tang or handle so that the plate may be used with facility to perform the work, as will be hereinafter described and represented.

To enable those skilled in the art to fully understand my invention I will proceed to describe it.

A. represents a steel plate of a quadrilateral form, as represented in the drawings, which is secured to a tang B. that has a shoulder $a$, on it against which the plate bears, and a triangular projection $b$, that passes through a corresponding hole in the middle of the plate A. and with the screw $c$, the plate may be secured rigidly to the tang. The tang B. is secured to a wooden handle C. The edge $d$, of the plate is straight, $e$, is slightly convex or curved outward, $f$, is slightly convex and $g$, is straight and at, or nearly at, right angles to the straight edge $d$. The angular corners $h, h'$, of the plate are acute, $h'$, being very acute; and the corners $i, i'$ are rounded, as represented in the drawings, the corner $i$, being the obtuse angle formed by the edges $f, g$. Each of the four sides of the plate A. is brought to an edge by a basil on the outer side of the plate.

I thus obtain a scraper which may be used for scraping the pitch, gum, &c., from the seams of the decks of vessels, with the same facility as those at present used, and I also obtain a scraper which may be used to great advantage in scraping and cleaning out crevices, scraping the surfaces of covings where abrupt and gentle curves are found, and for all and every purpose where scraping is required about a vessel, it may be done with the one herein above described.

I am aware that trilateral scrapers with straight edges are now, and have been in common use for scraping the seams in the decks and sides of vessels, and that a scraper has been patented with concave sides or edges for scraping the masts of vessels, but these scrapers will serve only for the plane or cylindrical surfaces for which they are intended, and they could not be used for scraping covings, angular corners, and about such places as my scraper is intended for.

I do not claim broadly the employment or use of a trilateral or polygonal plate as a scraper irrespective of the convex, rounding, straight and angular sides or edges herein described and represented; but—

I claim as new and desire to secure by Letters Patent as an improved article of manufacture—

A ship scraper provided with edges $d, e, f, g$, corners $h, h'$, and $i, i'$, and attached to a tang B, and handle C, all as herein shown and described.

JOHN C. GIBBS.

Witnesses:
THOMAS S. PEIRCE,
JAMES E. PEIRCE.